United States Patent
Lim et al.

(10) Patent No.: US 9,300,937 B2
(45) Date of Patent: Mar. 29, 2016

(54) COLOR IMAGE SENSOR AND OPERATING METHOD THEREOF

(71) Applicant: PIXART IMAGING (PENANG) SDN.BHD., Penang (MY)

(72) Inventors: Kevin Len-Li Lim, Pulau Pinang (MY); Willie Song, Penang (MY); Keng-Yeen Lye, Penang (MY)

(73) Assignee: Pixart Imaging (Penang) Sdn, Bhd., Penang (MY)

( * ) Notice: Subject to any disclaimer, the term of this patent is extended or adjusted under 35 U.S.C. 154(b) by 147 days.

(21) Appl. No.: 14/315,470

(22) Filed: Jun. 26, 2014

(65) Prior Publication Data

US 2015/0381957 A1    Dec. 31, 2015

(51) Int. Cl.
*H04N 9/73* (2006.01)
*H04N 9/04* (2006.01)

(52) U.S. Cl.
CPC . *H04N 9/735* (2013.01); *H04N 9/04* (2013.01)

(58) Field of Classification Search
CPC ........... H04N 9/735; H04N 9/04; H04N 9/11; H04N 9/045; H04N 2209/042; H04N 2209/047; H04N 5/3537; H04N 9/10; H04N 2209/045; H04N 2209/046; H04N 5/3458; H04N 9/67; H04N 9/76; H01L 31/00; H01L 37/14667; H01L 27/14868; H01L 27/14621; G06T 3/4015
See application file for complete search history.

(56) References Cited

U.S. PATENT DOCUMENTS

| | | | |
|---|---|---|---|
| 2003/0002094 A1* | 1/2003 | Suzuki | H04N 9/045 358/513 |
| 2005/0057670 A1* | 3/2005 | Tull | H04N 5/217 348/241 |
| 2005/0157191 A1* | 7/2005 | Shimizu | H01L 27/14868 348/272 |
| 2005/0248667 A1* | 11/2005 | Schweng | H04N 5/2355 348/234 |
| 2007/0285540 A1* | 12/2007 | Kwon | H04N 5/332 348/272 |
| 2008/0068475 A1* | 3/2008 | Choe | G06T 3/4015 348/273 |
| 2009/0153658 A1* | 6/2009 | Saveliev | H04N 5/2252 348/135 |
| 2009/0231471 A1* | 9/2009 | Isoo | H04N 5/2178 348/241 |
| 2010/0231755 A1* | 9/2010 | Sekine | G06T 3/4015 348/234 |
| 2011/0043671 A1* | 2/2011 | Yamaguchi | G06T 1/00 348/280 |
| 2011/0317048 A1* | 12/2011 | Bai | H01L 27/1461 348/294 |
| 2012/0188400 A1* | 7/2012 | Smith | H01L 27/14621 348/223.1 |

\* cited by examiner

*Primary Examiner* — Roberto Velez
*Assistant Examiner* — Tuan Le
(74) *Attorney, Agent, or Firm* — Rosenberg, Klein & Lee

(57) ABSTRACT

There is provided a color image sensor including a sensing array and a processing unit. The sensing array includes a red pixel, a green pixel, a blue pixel, a red and green pixel and a red and blue pixel configured to output a detected signal, respectively. The processing unit is configured to calculate a signal difference between detected signals associated with the red pixel and the red and green pixel to be served as a red detected signal, calculate a signal difference between detected signals associated with the green pixel and the red and green pixel to be served as a green detected signal, and calculate a signal difference between detected signals associated with the blue pixel and the red and blue pixel to be served as a blue detected signal.

20 Claims, 6 Drawing Sheets

COLOR IMAGE SENSOR AND OPERATING METHOD THEREOF

BACKGROUND

1. Field of the Disclosure

This disclosure generally relates to an image sensing device and, more particularly, to a color image sensor and arrangement of color filters and operating method thereof that may eliminate the influence of infrared light components by post-processing.

2. Description of the Related Art

In the conventional color image sensor, every pixel of an image sensing array is overlaid with a red color filter, a green color filter or a blue color filter to allow the pixels under the color filters can only detect the energy of specific spectral range.

For example, FIG. 1 respectively shows the normalized wavelength response of red, green and blue color filters. It is clear from FIG. 1 that IR light over the wavelength of about 800 nm can still penetrate the red, green and blue color filters. As a pixel is configured to detect light energy impinging on the sensing surface thereof and when the color filter covering thereon is not able to block the IR light effectively, the detected signal outputted by every pixel also contains the light energy of IR light components. For example, the detected signal of the pixel covered by a red color filter contains components of red light and IR light; the detected signal of the pixel covered by a green color filter contains components of green light and IR light; and the detected signal of the pixel covered by a blue color filter contains components of blue light and IR light. Particularly, when the environment further has an IR light source, the energy of IR light components in the detected signal may be larger than that of red, green or blue light components such that each light color may not be detected correctly.

The aforementioned IR light components may have obvious influence in some applications. For example, if it is desired to construct the spectrum of ambient light according to detect signals of red light, green light and blue light, a correct wavelength response may not be constructed due to the existence of IR light components.

SUMMARY

Accordingly, the present disclosure further provides a color image sensor and arrangement of color filters and operating method thereof capable of overcoming the disadvantages of the above conventional color image sensors.

The present disclosure provides a color image sensor and operating method thereof that may eliminate infrared light components by post-processing so as to improve the accuracy of color detection and construct a broad visible light response.

The present disclosure further provides an arrangement of color filters of a color image sensor that may achieve the effects of gesture recognition and ambient light detection.

The present disclosure further provides a color image sensor including a sensing array and a processing unit. The sensing array includes a red pixel, a green pixel, a blue pixel, a red and green pixel, and a red and blue pixel configured to output a detected signal, respectively. The processing unit is configured to calculate a signal difference between the detected signal associated with the red pixel and the detected signal associated with the red and green pixel to be served as a red detected signal; calculate a signal difference between the detected signal associated with the green pixel and the detected signal associated with the red and green pixel to be served as a green detected signal; and calculate a signal difference between the detected signal associated with the blue pixel and the detected signal associated with the red and blue pixel to be served as a blue detected signal. In this manner, it is able to construct a correct wavelength response of red, green and blue light.

The present disclosure further provides a color image sensor including a sensing array and a plurality of red filter layers, a plurality of green filter layers, a plurality of blue filter layers, a plurality of red and green filter layers, and a plurality of red and blue filter layers. The sensing array includes a plurality of sensing pixels respectively configured to output a detected signal, wherein the sensing pixels are divided into at least two pixel regions and detected signals of all sensing pixels of each of the pixel regions are configured to generate a sum of detected signals or an average of detected signals. The red filter layers, the green filter layers, the blue filter layers, the red and green filter layers, and the red and blue filter layers are respectively overlaid on the sensing pixels to form a plurality of red pixels, a plurality of green pixels, a plurality of blue pixels, a plurality of red and green pixels, and a plurality of red and blue pixels, wherein all of the pixel regions include an identical number of the red pixels, an identical number of the green pixels, an identical number of the blue pixels, an identical number of the red and green pixels, and an identical number of the red and blue pixels. In this manner, the color image sensor using this arrangement of color filters may be adapted to the application of gesture recognition.

The present disclosure further provides an operating method of a color image sensor. A sensing array of the color image sensor includes at least one red pixel, at least one green pixel, at least one blue pixel, at least one red and green pixel, and at least one red and blue pixel. The operating method includes the steps of: sensing light with the sensing array to allow each of sensing pixels to output a detected signal, respectively; calculating, using a processing unit, a signal difference between the detected signal associated with the red pixel and the detected signal associated with the red and green pixel to be served as a red detected signal; calculating, using the processing unit, a signal difference between the detected signal associated with the green pixel and the detected signal associated with the red and green pixel to be served as a green detected signal; and calculating, using the processing unit, a signal difference between the detected signal associated with the blue pixel and the detected signal associated with the red and blue pixel to be served as a blue detected signal. In this manner, it is able to construct a correct wavelength response of red, green and blue light.

In an aspect, the red pixel may be formed by overlaying a red filter layer upon a sensing pixel; the green pixel may be formed by overlaying a green filter layer upon a sensing pixel; the blue pixel may be formed by overlaying a blue filter layer upon a sensing pixel; the red and green pixel may be formed by sequentially stacking a red filter layer and a green filter layer upon a sensing pixel; and the red and blue pixel may be formed by sequentially stacking a red filter layer and a blue filter layer upon a sensing pixel, wherein said filter layers may be formed by coating or by disposing a color filter plate.

In an aspect, the sensing array may further include at least one clear pixel configured to output an ambient light detected signal. For example, each of the pixel regions includes an identical number of the clear pixels, wherein said clear pixel is referred to the sensing pixel not overlaid with any color filter layer that may detect all spectral energy in ambient light detectable by a photodiode.

In an aspect, the processing unit may further be configured to construct a mixing light response according to ratios of the red detected signal, the green detected signal and the blue detected signal, wherein said ratios may be determined according to actual applications.

In an aspect, the processing unit may further calculate a sum of detected signals or an average of detected signals of the detected signal outputted by all sensing pixels of each of a plurality of pixel regions of the sensing array to accordingly perform the gesture recognition.

In an aspect, the processing unit may implement the post-processing of the red detected signal, the green detected signal and the blue detected signal by software, hardware or firmware.

In the color image sensor, arrangement of color filters and operating method according to the embodiment of the present disclosure, the effects of gesture recognition, ambient light detection and improving the accuracy of color detection may be achieved by using a predetermined arrangement of color filters and post-processing detected signals. In addition, the desired mixing light response may be constructed according to the obtained detected signals of every light color so as to improve the practicality of the color image sensor.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 1:
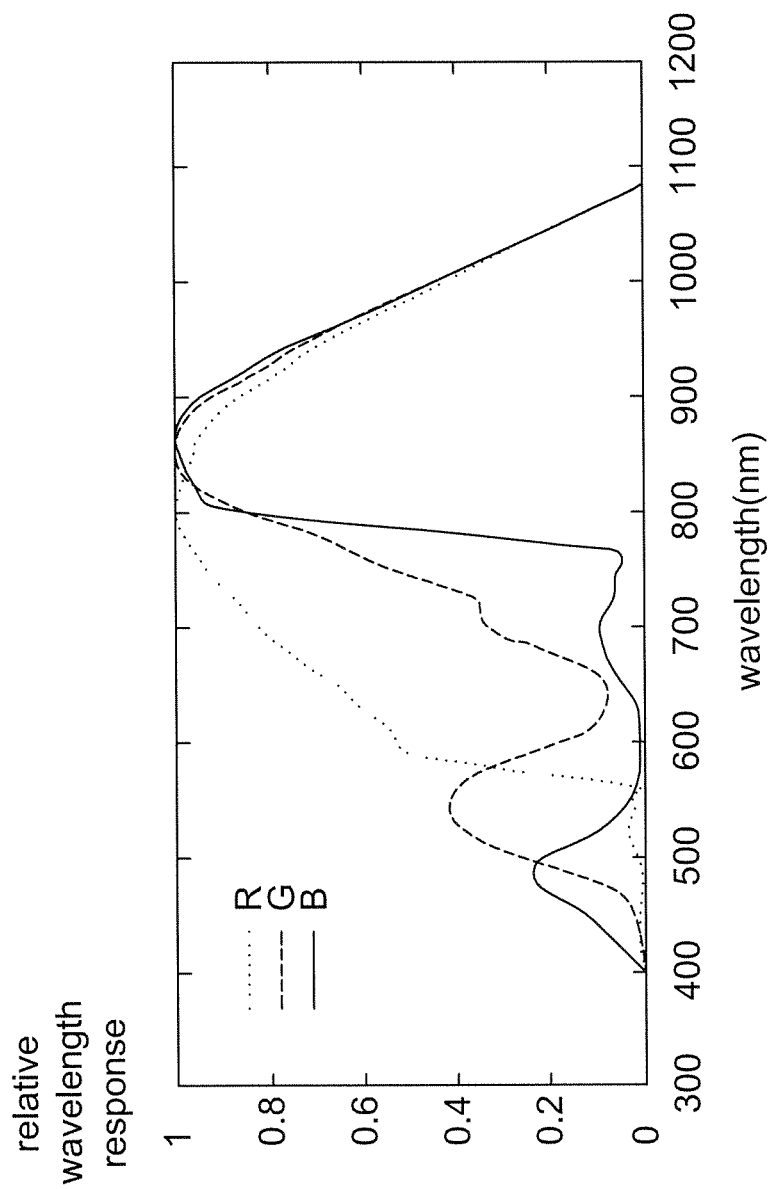
FIG. 1 shows a schematic diagram of the normalized wavelength response of color filters.
Figure 2:
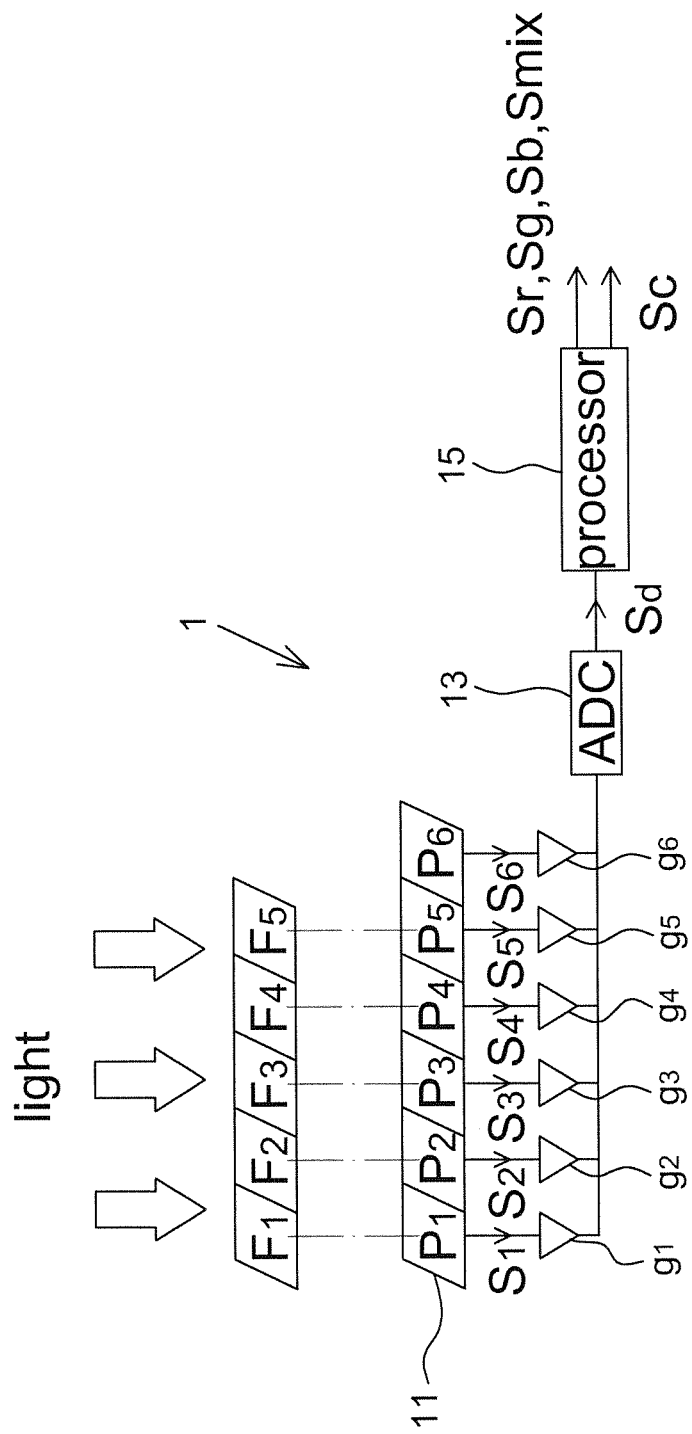
FIG. 2 shows a schematic diagram of the color image sensor according to an embodiment of the present disclosure.

Referring to FIG. 2, it shows a schematic diagram of the color image sensor 1 according to an embodiment of the present disclosure. The color image sensor 1 includes a sensing array 11, an analog-to-digital converter (ADC) 13 and a processing unit 15. It should be mentioned that although FIG. 2 shows that the ADC 13 is separated from the sensing array 11 and the processing unit 15, it is not to limit the present disclosure.

In one embodiment, the ADC 13 may be combined with the sensing array 11 to form an optoelectronic device configured to detect optical energy and output digital electrical signals, and detected signals Sd processed by the processing unit 15 are digital signals.

In another embodiment, the ADC 13 may be included in the processing unit 15, and the processing unit 15 receives and processes analog detected signals Sd' (electrical signals). For example, the processing unit 15 may perform the differential calculation (described later) of the analog detected signals Sd' at first and then convert the calculated result to digital signals, or the processing unit 15 may convert the analog detected signals Sd' to digital signals at first and then perform the differential calculation. It should be mentioned that as the processing unit 15 may process analog or digital detected signals depending on the disposed position of the ADC 13, the detected signal hereinafter is referred to "Sd", but it is not to limit the present disclosure.

The sensing array 11 includes a plurality of sensing pixels, e.g. 6 sensing pixels P1 to P6 being shown in this embodiment, configured to output a detected signal Sd respectively. For example, each of the sensing pixels includes at least one photodiode configured to sense optical energy and output electrical signals $S_1$ to $S_6$ and includes an amplification unit configured to amplify the electrical signals $S_1$ to $S_6$ with a predetermined gain, e.g. $g_1$ to $g_6$, so as to output the detected signal Sd. wherein the electrical signals $S_1$ to $S_6$, which may be current signals or voltage signals, are proportional to the light intensity impinging on the sensing pixels P1 to P6. It should be mentioned that the number and the arrangement of the sensing pixels included in the sensing array 11 are not limited to those shown in FIG. 2 and may be determined according to different applications without particular limitation.

In one embodiment, the sensing array 11 my include, for example, a red pixel, a green pixel, a blue pixel, a red and green pixel, a red and blue pixel, and a clear pixel configured to output a detected signal Sd, respectively. The red pixel may be formed by overlaying a red filter layer F1 on a sensing pixel P1; the green pixel may be formed by overlaying a green filter layer F2 on a sensing pixel P2; the blue pixel may be formed by overlaying a blue filter layer F3 on a sensing pixel P3; the red and green pixel may be formed by sequentially stacking a red filter layer and a green filter layer F4 on a sensing pixel P4; the red and blue pixel may be formed by sequentially stacking a red filter layer and a blue filter layer F5 on a sensing pixel P5; and the clear pixel is referred to a sensing pixel P6 not overlaid with a filter layer and thus the clear pixel may detect all spectrum detectable by a photodiode, wherein the aforementioned filter layers may be formed by disposing a color filter plate or directly coating a filtering material.

Figure 3:
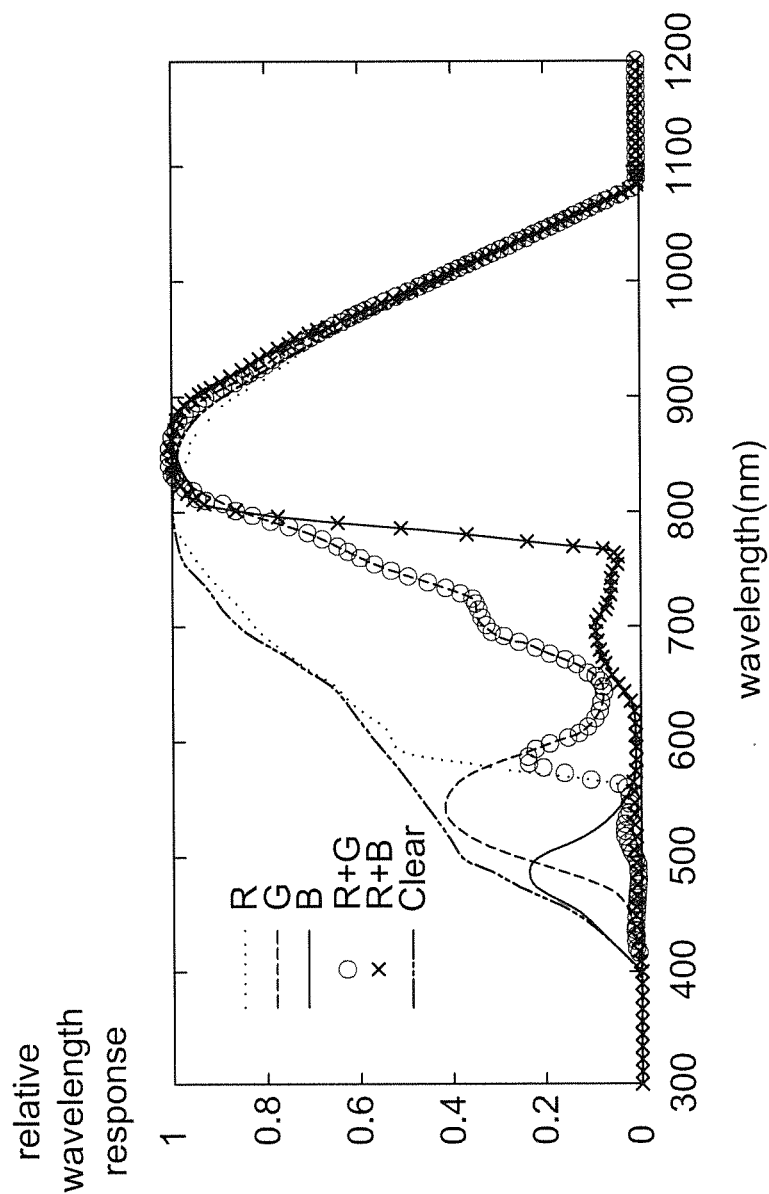
FIG. 3 shows a schematic diagram of the normalized wavelength response of the color image sensor according to an embodiment of the present disclosure.

For example, FIG. 3 shows a normalized wavelength response of the aforementioned 6 sensing pixels in this embodiment. It should be mentioned that the wavelength response of every color pixel shown in FIG. 3 is associated with the filter layers being used and not limited to that shown in FIG. 3.

In order to correctly detect different light colors, in this embodiment the processing unit 15 processes the detected signals Sd associated with the sensing pixels in a way of post-processing so as to eliminate infrared light components. For example, the processing unit 15 may be configured to calculate a signal difference between the detected signal digit $(S_1 \times g_1)$ associated with the red pixel and the detected signal digit$(S_4 \times g_4)$ associated with the red and green pixel to be served as a red detected signal Sr=digit$(S_1 \times g_1)$−digit$(Seg_4)$; calculate a signal difference between the detected signal digit $(S_2 \times g_2)$ associated with the green pixel and the detected signal digit$(S_4 \times g_4)$ associated with the red and green pixel to be served as a green detected signal Sg=digit$(S_2 \times g_2)$−digit$(S_4 \times g_4)$; and calculate a signal difference between the detected signal digit$(S_3 \times g_3)$ associated with the blue pixel and the detected signal digit($S_5 \times g_5$) associated with the red and blue pixel to be served as a blue detected signal Sg=digit($S_3 \times g_3$)−digit($S_5 \times g_5$). In addition, the clear pixel herein is configured to directly detect ambient light components, and thus when the color image sensor 1 is configured to detect only red, green and blue light components, the clear pixel may not be implemented.

In other words, in this embodiment as the detected signal digit($S_1 \times g_1$) of the red pixel contains infrared light components, digit($S_1 \times g_1$) is not directly used as the red detected signal Sr; as the detected signal digit($S_2 \times g_2$) of the green pixel contains infrared light components, digit($S_2 \times g_2$) is not directly used as the green detected signal Sg; and as the detected signal digit($S_3 \times g_3$) of the blue pixel contains infrared light components, digit($S_3 \times g_3$) is not directly used as the blue detected signal Sb. In this manner, the wavelength response of red, green and blue light may be correctly obtained by performing the differential calculation. It should be mentioned that said post-processing (or differential calculation) may be implemented by software, hardware or firmware in the processing unit 15. In addition, although the processing unit 15 in FIG. 2 is shown to process digital signals, as mentioned above the processing unit 15 may also directly process analog signals of every sensing pixel, e.g. $S_1 \times g_1, S_2 \times g_2, S_3 \times g_3, S_4 \times g_4, S_5 \times g_5, S_6 \times g_6$.

Figure 4:
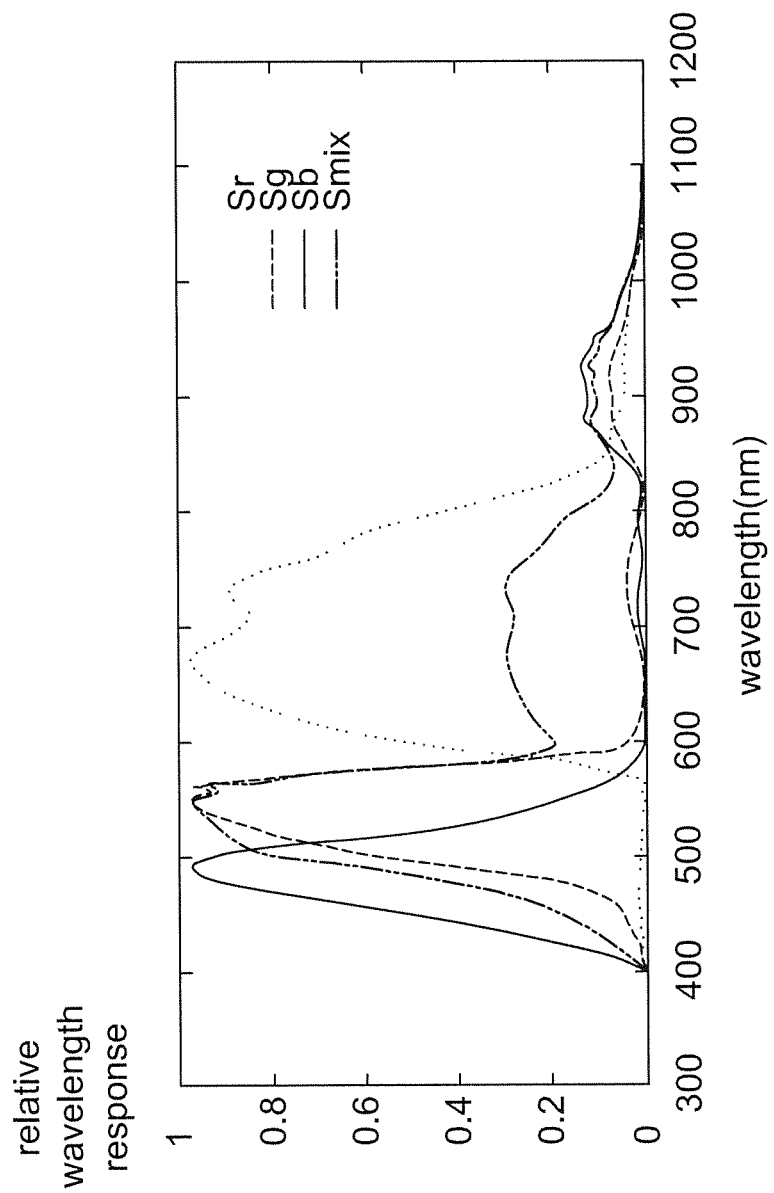
FIG. 4 shows a schematic diagram of the detected signals of every light color and the mixing light response of the color image sensor according to an embodiment of the present disclosure.

In addition, according to different applications, the processing unit 15 may optionally be configured to construct a mixing light response according to ratios of the red detected signal Sr, the green detected signal Sg and the blue detected signal Sb as shown in equation (1) below $$Smix = Kr \times Sr + Kg \times Sg + Kb \times Sb \quad (1)$$

wherein Kr, Kb, Kb are ratio constants associated with red, green and blue light respectively and may be determined according to the required color components in different applications, i.e. the weighting of different light colors may be adjusted according to the setting of the ratio constants. For example, FIG. 4 shows the detected signals Sr, Sg and Sb of every light color and the mixing light response in the condition of Kr=0.2'Kg=1.0'Kb=0.5. It is appreciated that the wavelength response of FIG. 4 is exemplary but not to limit the present disclosure.

In addition to detect components of different light colors (e.g. red, green and blue) and calculate the mixing light response according to the components of different light colors, the color image sensor 1 according to the present disclosure may further be configured to perform the gesture recognition according to a sum or average of a plurality of pixel regions. Accordingly, the arrangement of color pixels of the sensing array 11 should preferably be designed.

In this embodiment, the plurality of sensing pixels of the sensing array 11 may be divided into at least two pixel regions and the detected signals Sd of all sensing pixels in each of the pixel regions are configured to generate a sum of detected signals or an average of detected signals, e.g. calculated by the processing unit 15. As mentioned above, a plurality of red filter layers F1, a plurality of green filter layers F2, a plurality of blue filter layers F3, a plurality of red and green filter layers F4, and a plurality of red and blue filter layers F5 are respectively overlaid on the sensing pixels so as to form a plurality of red pixels R, a plurality of green pixels G, a plurality of blue pixels B, a plurality of red and green pixels R+G, and a plurality of red and blue pixels R+B.

Figure 5:
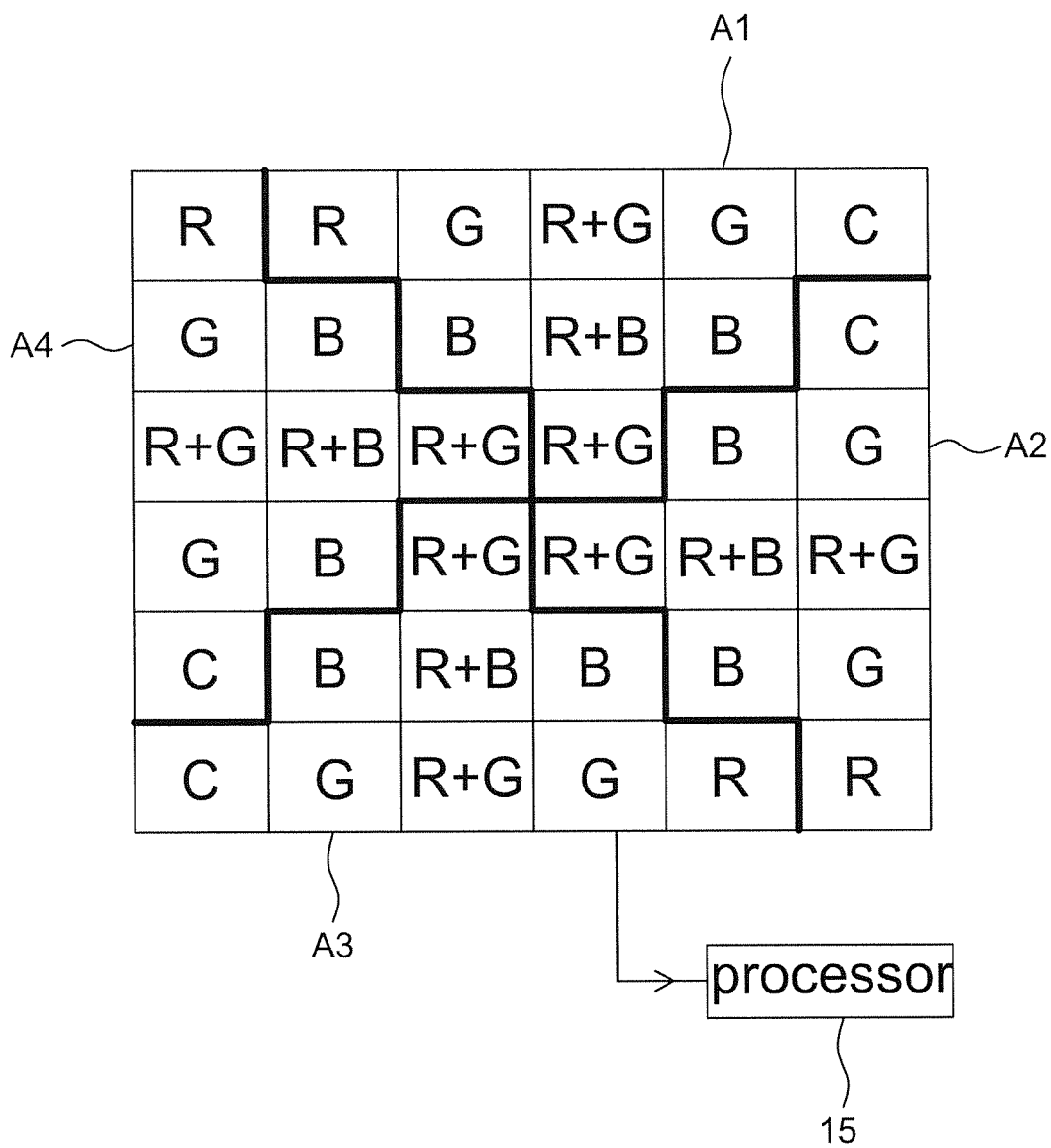
FIG. 5 shows a schematic diagram of the arrangement of color filters of the color image sensor according to an embodiment of the present disclosure.

In this embodiment, the arrangement of the pixel regions may be determined according to the direction of gesture recognition to be performed. For example, if it is desired to recognize the gesture direction only along the horizontal or vertical direction, the sensing array 11 may only include two pixel regions distributed transversally or longitudinally. However, if it is desired to recognize the gesture direction along both the horizontal and vertical directions, the sensing matrix 11 may include 4 pixel regions A1 to A4 and each of the pixel regions A1 to A4 may be arranged adjacent to an edge of the sensing array 11. For example, FIG. 5 shows that the pixel region A1 is arranged to adjacent to the upper edge of the sensing array 11; the pixel region A2 is arranged to adjacent to the right edge of the sensing array 11; the pixel region A3 is arranged to adjacent to the lower edge of the sensing array 11; and the pixel region A4 is arranged to adjacent to the left edge of the sensing array 11. The pixel regions A1 and A3 may be configured to detect the gesture along the vertical direction, and the pixel regions A2 and A4 may be configured to detect the gesture along the horizontal direction.

In this embodiment, in order to allow each of the pixel regions to output meaningful results, each of the pixel regions may include an identical number of the red pixels R, an identical number of the green pixels G, an identical number of the blue pixels B, an identical number of the red and green pixels R+G, and an identical number of the red and blue pixels R+B. For example, FIG. 5 shows that all of the pixel regions A1 to A4 include 1 red pixel, 2 green pixels, 2 blue pixels, 2 red and green pixels R+G, and 1 red and blue pixel R+B.

In addition, FIG. 5 shows that each of the pixel regions may further include an identical number (e.g. 1 herein) of clear pixel C configured to output an ambient light detected signal. It is appreciated that the number and the arrangement of every color sensing pixel in FIG. 5 are only intended to illustrate.

The predetermined gains $g_1$ to $g_6$ of the amplification unit of each sensing pixel of the color image sensor 1 in the present disclosure may be calibrated before shipment. For example, a narrow band infrared light source (e.g. 900 nm, but not limited to), such as the IR laser, IR light emitting diode, IR organic light emitting diode, halogen lamp emitting light through a narrow IR bandpass filter or the like, may be used to illuminate all sensing pixels of the sensing array 11 uniformly and it is able to adjust the predetermined gains $g_1$ to $g_6$ to allow each of the sensing pixels R, G, B, R+G, R+G and C to output identical predetermined detected signals, wherein the predetermined detected signal may be voltage signals, current signals or digitized voltage signals. In this embodiment, $g_1$ is referred to a predetermined gain of the red pixel R; $g_2$ is referred to a predetermined gain of the green pixel G; $g_3$ is referred to a predetermined gain of the blue pixel B; $g_4$ is referred to a predetermined gain of the red and green pixel R+G; $g_5$ is referred to a predetermined gain of the red and blue pixel R+B; and $g_6$ is referred to a predetermined gain of the clear pixel C.

In one embodiment, the processing unit 15 may perform the gesture recognition according to the sum of detected signals or average of detected signals. For example, the processing unit 15 may recognize the gesture along the vertical direction according to value variations of the sum of detected signals or average of detected signals between the pixel regions A1 and A3 and/or recognize the gesture along the horizontal direction according to value variations of the sum of detected signals or average of detected signals between the pixel regions A2 and A4. For example in one embodiment, when the sum of detected signals or average of detected signals of the pixel region A1 becomes larger and the sum of detected signals or average of detected signals of the pixel region A3 becomes smaller, it is able to recognize that an object moves upward or downward; and when the sum of detected signals or average of detected signals of the pixel region A2 becomes larger and the sum of detected signals or average of detected signals of the pixel region A4 becomes smaller, it is able to recognize that the object moves rightward or leftward. However, the gesture recognition method of the present disclosure is not limited to those disclosed herein.

Figure 6:
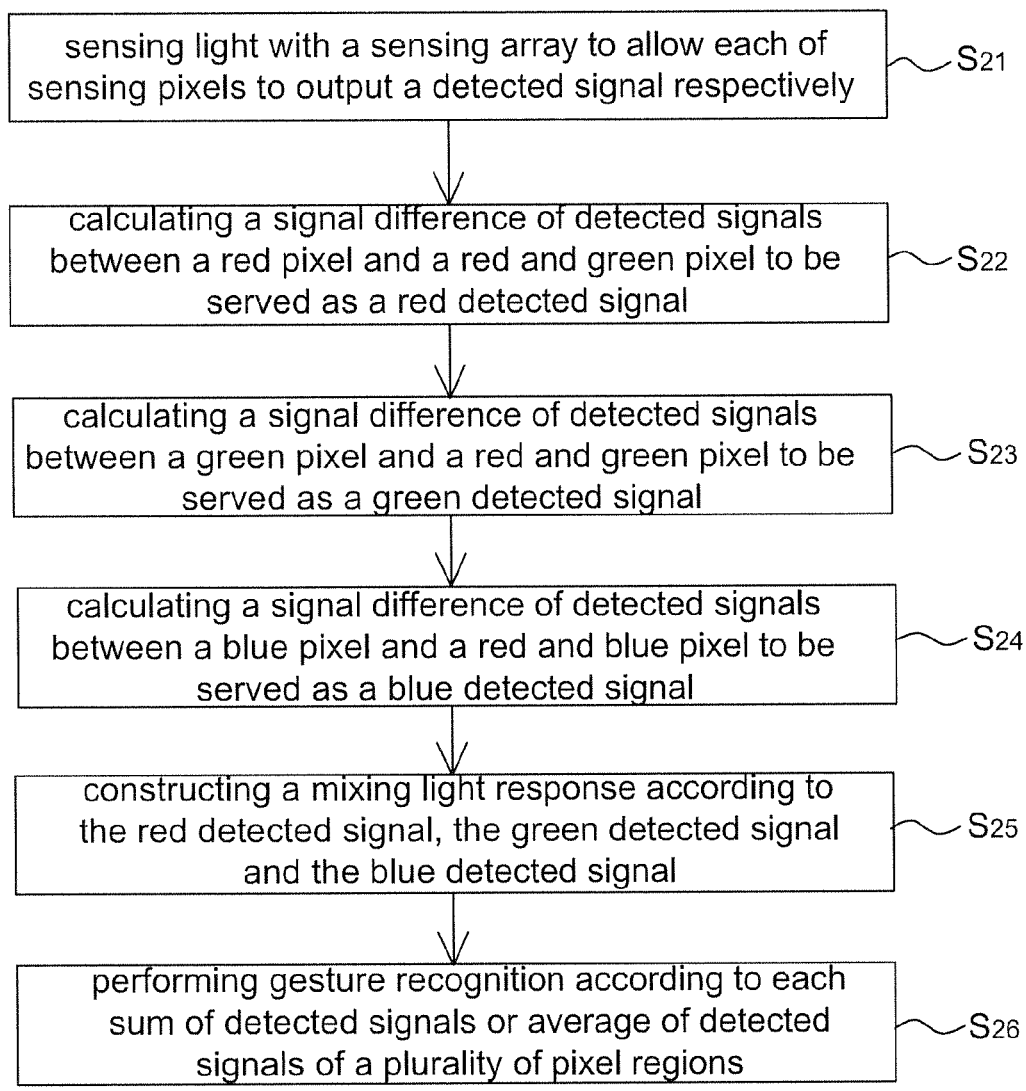
FIG. 6 shows a flow chart of the operating method of the color image sensor according to an embodiment of the present disclosure.

Referring to FIG. 6. it shows a flow chart of the operating method of the color image sensor according to an embodiment of the present disclosure, including to the following steps: sensing light with a sensing array to allow each of sensing pixels to output a detected signal Sd respectively (Step $S_{21}$); calculating a signal difference between the detected signal of a red pixel and the detected signal of a red and green pixel to be served as a red detected signal Sr (Step $S_{22}$); calculating a signal difference between the detected signal of a green pixel and the detected signal of a red and green pixel to be served as a green detected signal Sg (Step $S_{23}$); calculating a signal difference between the detected signal of a blue pixel and the detected signal of a red and blue pixel to be served as a blue detected signal Sb (Step $S_{24}$); constructing a mixing light response according to the red detected signal Sr, the green detected signal Sg and the blue detected signal Sb (Step $S_{25}$); and performing gesture recognition according to each sum of detected signals or average of detected signals of a plurality of pixel regions (Step $S_{26}$), wherein the Steps $S_{25}$ and $S_{26}$ may not be implemented according to different applications.

For example, if the color image sensor 1 is only configured to detect every color component, the processing unit 15 may only calculate the red detected signal Sr, the green detected signal Sg and the blue detected signal Sb, i.e. executing the Steps $S_{21}$ to $S_{24}$.

For example, if the color image sensor 1 may further calculate wavelength response of ambient light (or visible light) according to the component of each light color, the processing unit 15 may further calculate the mixing light response according to equation (1), i.e. executing the Steps $S_{21}$-$S_{25}$, and the aforementioned ratio constants Kr, Kg and Kb may be predetermined, automatically adjusted according to operating parameters or manually selected by the user.

For example, if the color image sensor 1 also has the function of gesture recognition, the processing unit 15 may further calculate a sum of detected signals or average of detected signals of the detected signal Sd outputted by all sensing pixels of each of a plurality of pixel regions (e.g. A1 to A4 of FIG. 5) and perform the gesture recognition according to the sum of detected signals or average of detected signals of each of the pixel regions, i.e. executing the Steps $S_{21}$ to $S_{24}$ and $S_{26}$, wherein one embodiment of executing the Step $S_{26}$ has been explained above with an example and thus details thereof are not described herein. The processing unit 15 may also output a control signal Sc according to the recognized result so as to correspondingly control a display or a host to execute corresponding operations, e.g. moving a cursor, but not limited to.

As mentioned above, the detection results of conventional color image sensors can be significantly influenced by infrared light such that errors can occur in some applications. Therefore, the present disclosure further provides a color image sensor and operating method thereof (FIGS. 2 and 5) that may eliminate the infrared light component through post-processing the detected information so as to construct correct wavelength responses of red, green and blue light and the constructed wavelength responses of red, green and blue light may be applied to, for example, construct the ambient light response thereby improving the detection accuracy and practicality. In addition, by properly arranging the color filter layers (or color pixels), the color image sensor may also be applied to the application of gesture recognition.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A color image sensor, comprising:
   a sensing array comprising a red pixel, a green pixel, a blue pixel, a red and green pixel, and a red and blue pixel configured to output a detected signal, respectively; and
   a processing unit configured to
      calculate a signal difference between the detected signal associated with the red pixel and the detected signal associated with the red and green pixel to be served as a red detected signal;
      calculate a signal difference between the detected signal associated with the green pixel and the detected signal associated with the red and green pixel to be served as a green detected signal; and
      calculate a signal difference between the detected signal associated with the blue pixel and the detected signal associated with the red and blue pixel to be served as a blue detected signal.

2. The color image sensor as claimed in claim 1, wherein the detected signal is a digital signal or an analog signal.

3. The color image sensor as claimed in claim 1, wherein the red pixel is formed by overlaying a red filter layer upon a sensing pixel;
   the green pixel is formed by overlaying a green filter layer upon a sensing pixel;
   the blue pixel is formed by overlaying a blue filter layer upon a sensing pixel;
   the red and green pixel is formed by stacking a red filter layer and a green filter layer upon a sensing pixel; and
   the red and blue pixel is formed by stacking a red filter layer and a blue filter layer upon a sensing pixel.

4. The color image sensor as claimed in claim 1, wherein the sensing array further comprises a clear pixel.

5. The color image sensor as claimed in claim 1, wherein the processing unit is further configured to construct a mixing light response according to ratios of the red detected signal, the green detected signal and the blue detected signal.

6. A color image sensor, comprising:
   a sensing array comprising a plurality of sensing pixels respectively configured to output a detected signal, wherein the sensing pixels are divided into at least two pixel regions and detected signals of all sensing pixels of each of the pixel regions are configured to generate a sum of detected signals or an average of detected signals; and
   a plurality of red filter layers, a plurality of green filter layers, a plurality of blue filter layers, a plurality of red and green filter layers, and a plurality of red and blue filter layers respectively overlaid on the sensing pixels to form a plurality of red pixels, a plurality of green pixels, a plurality of blue pixels, a plurality of red and green pixels, and a plurality of red and blue pixels,
   wherein the pixel regions comprise an identical number of the red pixels, an identical number of the green pixels, an identical number of the blue pixels, an identical number of the red and green pixels, and an identical number of the red and blue pixels.

7. The color image sensor as claimed in claim 6, wherein the red and green filter layers are formed by stacking a red filter layer and a green filter layer, and the red and blue filter layers are formed by stacking a red filter layer and a blue filter layer.

8. The color image sensor as claimed in claim 6, wherein each of the pixel regions of the sensing array further comprises at least one clear pixel not overlaid with a filter layer, and the pixel regions comprise an identical number of the clear pixel.

9. The color image sensor as claimed in claim 6, wherein the sensing array comprises 4 pixel regions and each of the pixel regions is arranged adjacent to an edge of the sensing array, respectively.

10. The color image sensor as claimed in claim 6, wherein the sum of detected signals and the average of detected signals are configured to perform gesture recognition.

11. An operating method of a color image sensor, a sensing array of the color image sensor comprising at least one red pixel, at least one green pixel, at least one blue pixel, at least one red and green pixel, and at least one red and blue pixel, the operating method comprising:
  sensing light with the sensing array to allow each of sensing pixels to output a detected signal, respectively;
  calculating a signal difference between the detected signal associated with the red pixel and the detected signal associated with the red and green pixel to be served as a red detected signal;
  calculating a signal difference between the detected signal associated with the green pixel and the detected signal associated with the red and green pixel to be served as a green detected signal; and
  calculating a signal difference between the detected signal associated with the blue pixel and the detected signal associated with the red and blue pixel to be served as a blue detected signal.

12. The operating method as claimed in claim 11, further comprising:
  constructing a mixing light response according to ratios of the red detected signal, the green detected signal and the blue detected signal.

13. The operating method as claimed in claim 11, further comprising:
  calculating a sum of detected signals or an average detected signals of the detected signal outputted by all sensing pixels of each of a plurality of pixel regions of the sensing array.

14. The operating method as claimed in claim 13, further comprising:
  performing gesture recognition according the sum of detected signals or the average of the detected signals of each of the pixel regions.

15. The operating method as claimed in claim 13, wherein the sensing array comprises 4 pixel regions and each of the pixel regions is arranged adjacent to an edge of the sensing array, respectively.

16. The operating method as claimed in claim 13, wherein the pixel regions comprise an identical number of the red pixels, an identical number of the green pixels, an identical number of the blue pixels, an identical number of the red and green pixels, and an identical number of the red and blue pixels.

17. The operating method as claimed in claim 16, wherein each of the pixel regions further comprises an identical number of clear pixels configured to output an ambient light detected signal.

18. The operating method as claimed in claim 11, wherein the detected signal is a digital signal or an analog signal.

19. The operating method as claimed in claim 11, wherein each of the sensing pixels of the sensing array outputs the detected signal with a predetermined gain.

20. The operating method as claimed in claim 19, wherein the predetermined gain is set by illuminating the sensing array with an IR laser to allow each of the sensing pixels to output an identical predetermined detected signal.

* * * * *